United States Patent [19]

Calmettes et al.

[11] Patent Number: 4,924,558
[45] Date of Patent: May 15, 1990

[54] CLAMP HAVING BOSS AND LUG USED FOR FASTENING

[75] Inventors: Lionel Calmettes; Michel Andre, both of Romorantin Lanthenay, France

[73] Assignee: Establissements Caillau, Issy Les Moulineaux, France

[21] Appl. No.: 354,873

[22] Filed: May 22, 1989

[30] Foreign Application Priority Data

May 25, 1988 [FR] France .................................. 88 06959

[51] Int. Cl.$^5$ .............................................. B65D 63/02
[52] U.S. Cl. ................................ 24/20 CW; 24/20 R; 24/20 EE
[58] Field of Search ............... 24/20 R, 20 CW, 20 S, 24/20 TT, 20 EE, 20 W, 23 R, 23 W, 23 EE, 25

[56] References Cited

U.S. PATENT DOCUMENTS

| 210,560 | 12/1878 | Robertshaw | 24/20 TT |
|---|---|---|---|
| 1,330,737 | 2/1920 | Coffman | 24/20 EE |
| 1,631,396 | 6/1927 | Beegle | 24/20 CW |
| 4,275,484 | 6/1981 | Irio et al. | 24/23 EE |
| 4,517,708 | 5/1985 | Calmettes et al. | 24/20 CW |
| 4,523,352 | 6/1985 | Wachter | 24/20 CW |
| 4,742,600 | 5/1988 | Calmettes et al. | 24/20 EE |
| 4,750,242 | 6/1988 | Calmettes et al. | 24/20 CW |

FOREIGN PATENT DOCUMENTS 932116 7/1963 United Kingdom ............. 24/20 EE

*Primary Examiner*—Victor N. Sakran
*Attorney, Agent, or Firm*—Lewis H. Eslinger; Jay H. Maioli

[57] ABSTRACT

This invention relates to a clamp comprising a metal band wound on itself, of which one of the ends is shaped as a hook and of which the other end presents a projecting lug allowing the free edge of the hook to be fastened. The lug presents a boss on its face serving as bearing for the free edge of the hook after fastening, this boss preferably being located substantially in the middle of the width of the lug, while the free edge of the hook comprises a notch whose shape is complementary to that of the boss of the lug.

6 Claims, 2 Drawing Sheets

CLAMP HAVING BOSS AND LUG USED FOR FASTENING

FIELD OF THE INVENTION

The present invention relates to a clamp.

BACKGROUND OF THE INVENTION

U.S. Pat. No. 4,275,484 in particular discloses a clamp essentially comprising a metal band wound on itself. One of the ends of the band is shaped as a hook, whilst the other end is provided with a substantially radial projecting lug allowing the free edge of the hook to be fastened.

The advantages of this type of clamp are well known at the present time, in particular its ease of assembly and dismantling, allowing it to be reused. However, it has appeared advantageous to improve the secure fastening of the clamp, particularly with respect to accidental shocks on the hook, this simultaneously increasing the facility of positioning and dismantling thereof.

SUMMARY OF THE INVENTION

According to a first feature of the invention, the lug presents a boss on its front face serving as bearing for the free edge of the hook after fastening. This boss is preferably located substantially in the middle of the width of the band. For its part, the free edge of the hook comprises a notch whose shape is complementary to that of the boss.

Furthermore, it is advantageous if that face of the boss most remote from the front face of the lug presents, measured widthwise of the band of the clamp, a relatively large dimension, preferably close to two thirds of this width. In this way, the section of the boss, through a plane parallel to a plane substantially tangential to the band in the region of the lug, will be generally T-shaped, of which the horizontal bar extends perpendicularly to the band.

Finally, whilst the boss will generally present an upper axial surface substantially parallel to the band, the upper surfaces of the two lateral arms will advantageously be inclined towards the base of the lug.

Thanks to these arrangements, the boss firstly constitutes a good bearing zone for the tightening tool, such as "universal pliers", whilst the hook may cover the lug almost completely on either side of its notch. In addition, after fastening, the boss, projecting at least by its axial portion, through the notch of the free edge of the hook, protects the latter, at least partly, against accidental shocks, for example of projectiles.

BRIEF DESCRIPTION OF THE DRAWINGS

The invention will be more readily understood on reading the following description with reference to the accompanying drawings, in which.

DETAILED DESCRIPTION OF THE DRAWINGS

Figure 1:
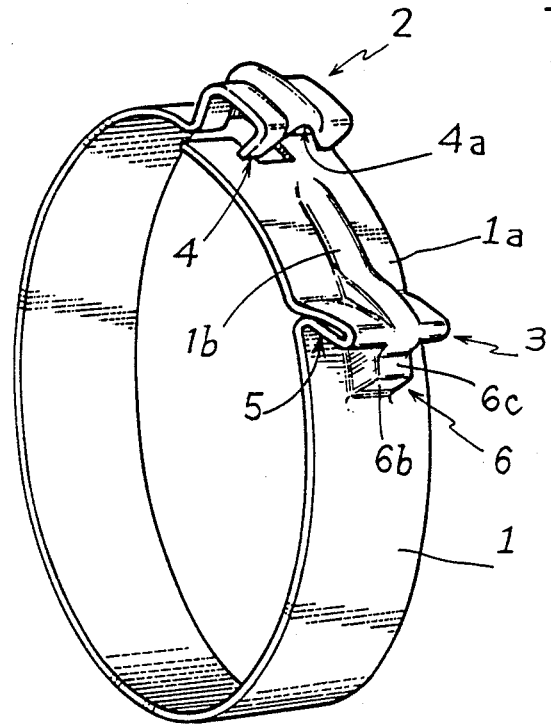
FIG. 1 shows a view in perspective of a clamp according to the invention, before it is tightened.
Figure 2:
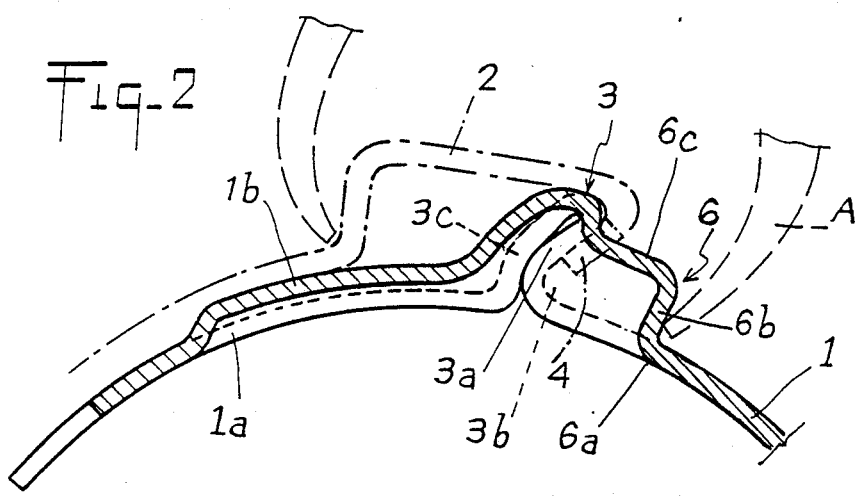
FIG. 2 shows a view in partial section of the clamp in the region of the lug.

Referring now to the drawings, and firstly to FIGS. 1 and 2, they show a clamp of the type described in U.S. Pat. No. 4,275,484; the metal band 1 wound on itself comprises a hook 2 and a substantially radial lug 3 behind which the free edge 4 of the hook may be fastened by means of a tool of the pliers type.

On its front face 5 serving as bearing for the free edge 4 of the hook, the lug 3 presents a boss 6 projecting with respect to the plane of the lug, in the direction opposite that of the hook before it is fastened. As shown in the drawing, the boss is disposed substantially in the middle of the width of the band 1, but this arrangement is in no way compulsory, particularly if it is deemed desirable, due to the dimensions of the clamp and in particular of the width of the band, to provide a plurality of bosses on the lug.

In practice, the boss 6 will generally be formed by pressing prior to folding the lug and will present a shape similar to that shown in section in FIG. 2. This shape is noteworthy in that the connection 6a of the boss to the band 1 is made substantially in front (to the right in FIG. 2) of the hollow 3b of the first fold 3a of the lug, receiving the end of the free edge of the hook. The front face 6b of the boss is preferably substantially flat, extends transversely and perpendicularly to the band 1, over a height close to that of the lug 3; the axial upper surface 6c of the boss is itself connected to the top of the lug 3 in any appropriate profile.

For its part, the free edge 4 of the hook presents a notch 4a whose shape is complementary to that of the upper surface 6c of the boss 6 and which constitutes a housing for the latter after the hook has fastened on the lug.

During tightening, the jaw A of the tool, shown schematically in broken lines, bears essentially on the boss 6, in the vicinity of its connection 6a to the band and does not risk hindering fastening of the free edge 4 of the hook 2 on the lug. Consequently, this free edge may be relatively long, which improves security of the fastening. Moreover, after fastening, the presence of the boss 6 projecting through the notch 4a constitutes both an element for centering the hook on the lug and an at least partial obstacle to the accidental action of a projectile in the vicinity of the hook when it is fastened.

As is known, particularly by European Patent No. 3192, the clamp of the type which has just been described advantageously comprises, beyond the lug 3, an extension 1a of the band adapted to ensure continuity of the inner periphery of the clamp after it has been tightened. Such an extension joins the band via the lug 3 which is in that case constituted by two folds 3a and 3c back to back, as is clearly shown in the drawings.

The outer face of the extension 1a presents a rib 1b which extends at least up to the immediate vicinity of the lug 3, and more particularly its second fold 3c, and may even exist partially or totally on this second fold, as shown in FIG. 2.

During tightening of the clamp, the edges of the notch 4a are guided by the rib 1b which, of course, will be disposed in the same plane as the boss 6. In this way, positioning of the clamp will be facilitated, the hook 2 and the lug 3 being guided towards each other, then centred with respect to each other at the moment of fastening.

Figure 3:
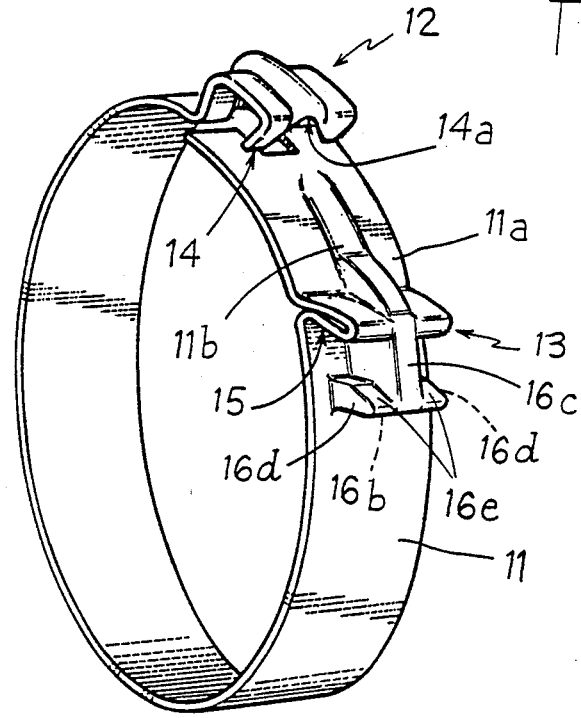
FIGS. 3 and 4 are views respectively similar to FIGS. 1 and 2, of a variant embodiment of the invention.
Figure 4:
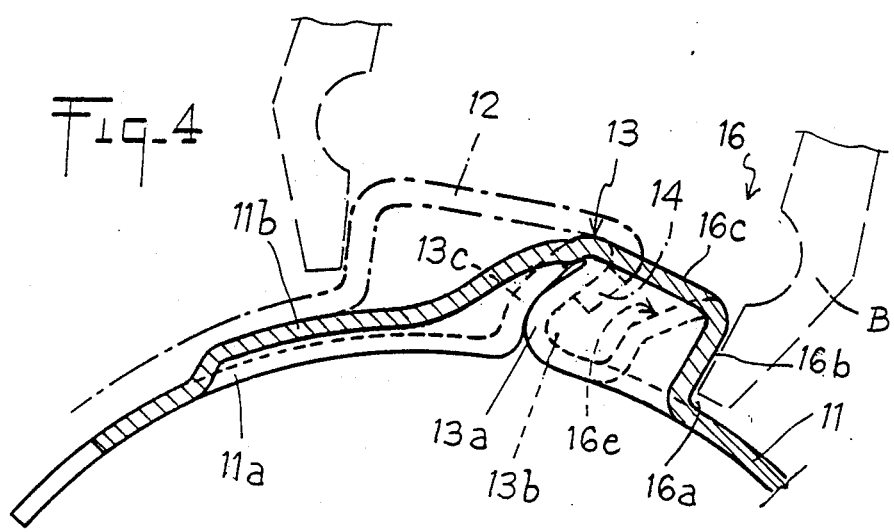

The variant embodiment shown in FIGS. 3 and 4 presents substantially the same structure as that shown in FIGS. 1 and 2. The elements already described bear the same references, increased by 10.

The boss 16 comprises an axial upper surface 16c, substantially parallel to the band 11 and its front face 16b, preferably flat, joins the band at 16a, well in front (to the right in FIG. 4) of the fold 13a of the lug and its hollow 13b. The base of this front face 16b as well as the front face itself are preferably substantially perpendicular to the band 11 and extend over a relatively large distance, for example close to two thirds of the width of the band. As is clearly shown in FIG. 3, the boss 16, and in particular its section through a plane parallel to the plane tangential to the band in the region of the lug 13, is generally in the form of a T.

However, the upper surface 16e of the lateral arms 16d of the T-shaped boss are inclined towards the hollow 13b, i.e. towards the base of the lug 13. This arrangement is particularly visible in FIG. 4.

Positioning and tightening of the clamp are effected in the same manner as described with reference to FIGS. 1 and 2, and present the same advantages.

However, it should be emphasized that the highly prominent form of the boss 16, as well as the relatively large dimensions of its flat front face 16b, alow the use, as tightening tool, of "universal pliers" B whose profile is schematically shown in broken lines in FIG. 4.

Furthermore, the inclination of the upper surfaces 16e of the lateral arms 16d of the boss makes it possible easily to slide the blade of a screwdriver into the hollow 13b of the lug. By forming a lever with the handle of the screw-driver whose bland bears on one of the lateral arms 16d, the end 14 of the hook 12 may be lifted and the latter may be unfastened from the lug 13.

What is claimed is:

1. In a clamp comprising a metal band wound on itself, of which one of the ends is shaped as a hook and of which the other end presents a projecting lug allowing fastening thereover of the free edge of the hook,
   the lug includes a boss arranged on a front face of the lug that serves as bearing for the free edge of the hook after fastening, the boss being located substantially in the middle of the width of the lug and having a width less than the band width at a zone of connection between the boss and the lug, whilst the free edge of the hook comprises a notch whose shape is complementary to that of the boss at the zone of connection, whereby said notch receives a portion of the boss upon fastening and ensures centering of the ends of the clamp.

2. The clamp of claim 1, in which the band comprises an extension extending beyond the lug, wherein said extension presents a rib projecting on its outer face, extending at least up to the immediate vicinity of the lug and located substantially in the same plane as the boss of the lug.

3. The clamp of claim 2, in which the lug is constituted by two folds of the band back to back, wherein the rib extends at least partly on the fold of the lug, located on the hook side before fastening thereof.

4. The clamp of any one of the preceding claims, wherein a front face of the boss is substantially transverse and perpendicular to the band and extends over a height close to that of the lug.

5. The clamp of claim 4, wherein the front face of the boss presents a large transverse dimension,
   having a width substantially equal to two thirds of the width of the band.

6. The claim of claim 5, wherein the upper edge of at least one of the lateral parts of the front face joins a surface inclined towards the base of the lug.

* * * * *